United States Patent [19]

Rotter

[11] 4,181,427

[45] Jan. 1, 1980

[54] OPTICAL PROJECTION APPARATUS

[76] Inventor: Johann Rotter, Hans Sperlstrasse 16, Salzburg, Austria

[21] Appl. No.: 885,524

[22] Filed: Mar. 10, 1978

[30] Foreign Application Priority Data

Mar. 11, 1977 [DE] Fed. Rep. of Germany ....... 2710736
Jun. 28, 1977 [DE] Fed. Rep. of Germany ....... 2729149

[51] Int. Cl.² .................... G03B 27/52; G03B 27/70
[52] U.S. Cl. ...................................... 355/43; 355/45; 355/65
[58] Field of Search ................ 355/18, 25, 37, 39–43, 355/45, 51, 60, 65, 66

[56] References Cited

U.S. PATENT DOCUMENTS

| | | | |
|---|---|---|---|
| 3,728,020 | 4/1973 | Abrams et al. | 355/65 X |
| 3,894,800 | 7/1975 | Rotter | 355/66 X |
| 4,059,355 | 11/1977 | Fritsch | 355/65 X |

Primary Examiner—Richard A. Wintercorn
Attorney, Agent, or Firm—Blanchard, Flynn, Theil, Boutell & Tanis

[57] ABSTRACT

A set of construction units or elements forming the subject of the invention permits the construction of various kinds or optical projection apparatus which are suitable for copying passages of literature and the like so as to produce in this way a collection of technical literature, for example in the form of a card index, for continuously supplementing the user's knowledge and for facilitating his scientific activities.

42 Claims, 21 Drawing Figures

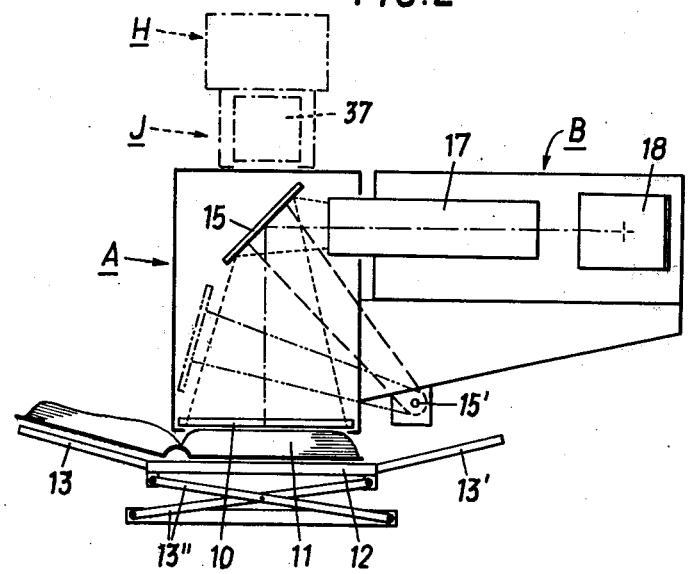
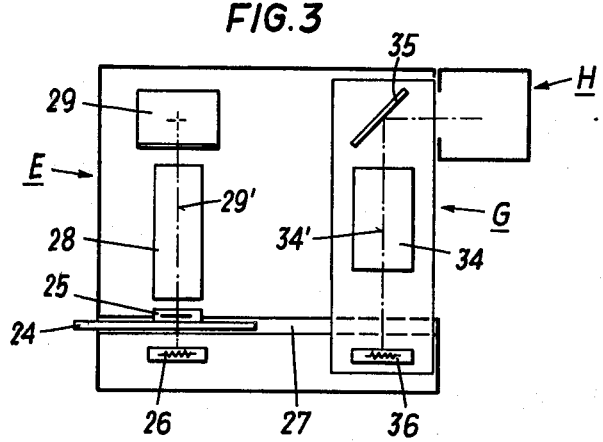
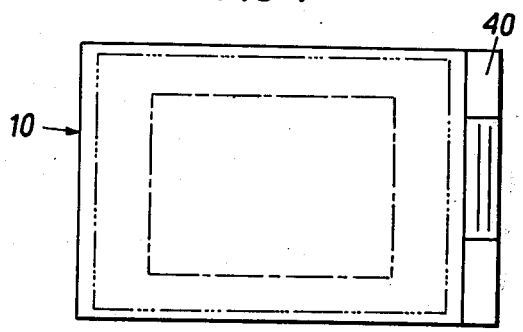

OPTICAL PROJECTION APPARATUS

The said set of construction units has a basic kit or basic apparatus and construction units attachable to this basic apparatus when required, whereby the apparatus can be rendered capable of performing additional functions.

The basic kit consists of at least one at least single-stage image-forming optical system arranged in at least one housing for reducing projection of originals of different formats readable with the naked eye (called macro-originals) and/or for re-enlarging projection of micro-originals of different formats on to at least part of an image support of uniform macroformat, exchangeable lenses of fixed and/or variable focal length and a fixed path length between the plane of the original and the plane of projection being provided and the planes for the macro-originals and/or micro-originals and the plane of projection for macroreproduction being moreover offset laterally with respect to one another and the ray flux from the plane of the macro-original and/or the plane of the micro-original to a projection plane for macroproduction being deflected by mirrors at least twice after the optical system and extending in a direction parallel to the planes of the originals between the first and last deflecting mirrors.

DESCRIPTION OF THE PRIOR ART

For collecting technical literature, documentation and drawings or illustrations, as required for every office for its records, by every expert for continuously supplementing his knowledge and converting it into capacity for facilitating his occupation, and by every technical library for its readers, pertinent data or documents must be considered, read and often also reproduced. It is frequently desired to be able to keep passages of literature (pages of text or groups of lines of a text) found in books, journals or the like after they have been brought to uniform formats, for example in a card index or filing cabinet.

In addition, however, it is also frequently necessary to be able to peruse literature which is in the form of microfilms of different formats and varying make-up and, at the same time, it is desired also to be able to make copies thereof readable with the naked eye and in the same uniform format.

It is true that there are in existence copiers for macro-originals and so-called reader-printers for the re-enlarged reproduction of microfilms, but there is no equipment which permits macro-originals and micro-originals to be copied in the same apparatus to a uniform card index format and/or miniature image format.

Again, in other cases, there is the need to possess collected passages of literature on microfilm, uniform in format and make-up, so as to have them to hand in a space-saving and readily accessible form, but there is also a desire, furthermore, to be able to identify or mark the copied originals individually or assembled in groups in an adequate manner.

The equipment offered on the market comprises many kinds of appropriate reading and reproduction apparatus which partly meet the above-mentioned requirements, but it does not comprise any set of construction units or elements from which, according to the market situation, types of apparatus with different capabilities can be assembled and also be subsequently extended or converted by the user for adaptation to changing requirements.

SUMMARY OF THE INVENTION

Accordingly, the problem underlying the invention is to provide a set of construction units or elements for constructing various kinds of optical projection apparatus which comprises a basic kit representing a basic apparatus and has supplementary construction units which can be attached to this basic apparatus and render the apparatus capable of performing additional functions. Moreover, it is an object of the invention to provide different kinds of projection apparatus which are formed from a basic apparatus and supplementary construction units attached thereto.

According to the invention, the basic kit consists of at least one at least single-stage image-forming optical system arranged in at least one housing for reducing projection of originals of different formats readable with the naked eye (called macro-originals) and/or for re-enlarging projection of micro-originals of different formats onto at least part of an image support of uniform macroformat, exchangeable lenses of fixed and/or variable focal length and a fixed path length between the plane of the original and the plane of projection being provided and the planes for the macro-originals and/or micro-originals and the plane of projection for macroreproduction being moreover offset laterally with respect to one another and the ray flux from the plane of the macro-original and/or the plane of the micro-original to a projection plane for macroprojection being deflected by mirrors at least twice after the optical system and extending in a direction parallel to the planes of the originals between the first and last deflecting mirrors.

According to a preferred embodiment, the planes of the original and of projection are parallel to one another and the ray flux for the projection of macro-originals in macro-projection are deflected by mirrors once before the optical system and twice after it and the ray flux for re-enlarging projection of micro-originals is deflected at least twice by mirrors only after the optical system.

The basic kit may therefore be arranged for the macro-reproduction of macro-originals or for the macro-reproduction of micro-originals or also be suitable for both, it being possible to reproduce originals of different formats readable with the naked eye in a uniform format, for example a filing or card-index card format, in a very simple and advantageous manner in consequence of the possibility of exchanging the optical system or varying the focal length. The fixed path length between the plane of the original and the reproduction plane ensures a substantial simplification of the structure of the apparatus and its operation. The lateral offsetting of the planes of the original and of reproduction results in a practical table apparatus, it being preferably possible for the planes to be arranged horizontally and approximately at the same height, which greatly facilitates operation with this apparatus. With the mentioned re-reflection of the ray flux, this aim can easily be achieved.

If the apparatus in the basic kit is arranged for re-enlargement of micro-originals, the re-enlarged reproductions can likewise be obtained in the same filing or card-index card format. By means of an attachable supplementary construction unit it is possible to direct the ray flux optionally onto a second projection plane (screen, reading plate) via a movable mirror after the optical system.

If the apparatus in the basic kit enables the macro-reproduction both of macro-originals and of micro-originals, the arrangement is preferably such that the last deflecting mirror in the ray flux from the two planes for macro-originals and micro-originals to the plane of reproduction in macroformat is variable in position and the two ray fluxes have a common plane of reproduction.

Other supplementary construction units consist of a microfilm camera which can be inserted in the ray flux coming from the macro-original in front of the optical system and permits the making of microreproductions of the macro-originals, and moreover a microfilm camera which can be inserted with the optical system in the ray flux coming from the micro-original in front of the lens and serves to enable copies of micro-originals to be produced on the same or a changed scale.

Additional construction elements or units are exchangeable cassettes for various kinds of photographic media, preferably with developing/fixing and transport arrangements.

Other attachable construction units serve to apply groups of lines from texts, for example identifying bibliographical data, at the margin of macroreproductions or to strips which can be added to microreproductions.

BRIEF DESCRIPTION OF THE DRAWINGS

The invention will now be described in more detail, solely by way of example, with reference to the accompanying drawings in which the various views are diagrammatic housings, for example, of individual component parts being shown only in parallelepipedal form and only in outline, lenses or objectives only as simple cylindrical bodies, holders for micro-originals only as rectangles and illumination systems for microfilms as hemispheres, and holders of lenses and deflecting mirrors not being shown. In the accompanying drawings:

FIG. 2 is a side view of the units A, B, H and J from the right with the front wall omitted;

FIG. 3 is a side view of the units E, G and H from the right with the housing wall omitted;

FIG. 4 is a plan view of a single element (glass plate);

DETAILED DESCRIPTION

Figure 1:
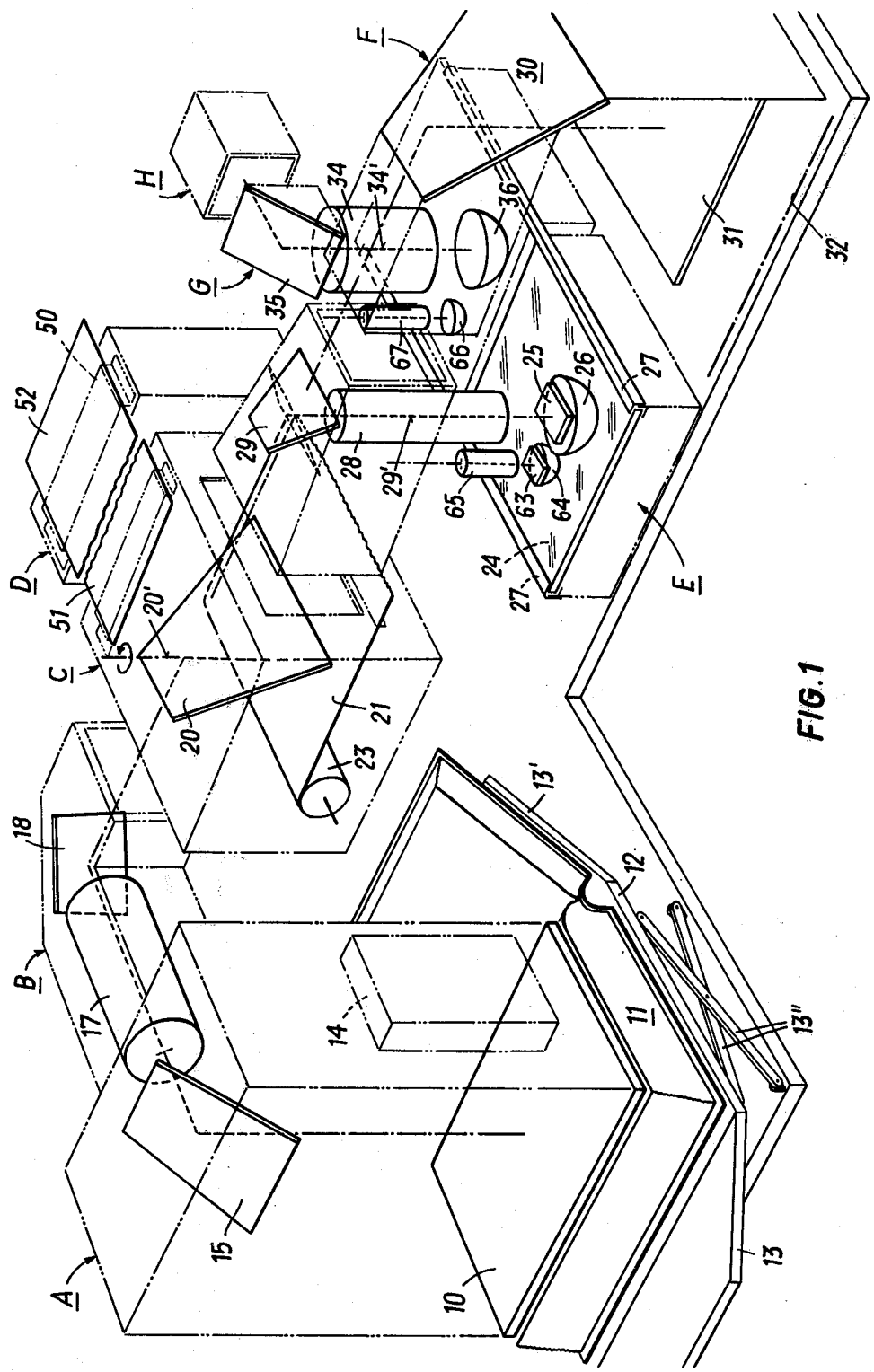
FIG. 1 is perspective view of an apparatus (universal apparatus) consisting of construction units or elements A, B, C, D, E, F, G and H in the position relationship of the units with respect to one another (but with gaps between them)
Figure 5:
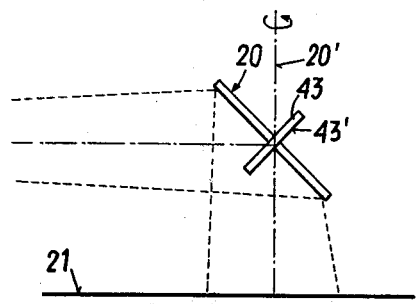
FIGS. 5 and 6 are an elevation and a plan view of a rotary deflecting mirror in a first representation.
Figure 7:
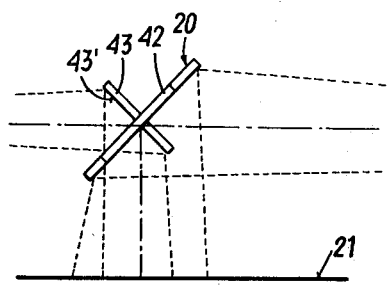
FIGS. 7 and 8 are an elevation and a plan view of the same rotary deflecting mirror in a second representation.
Figure 6:
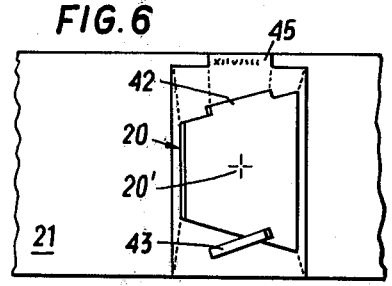
Figure 8:
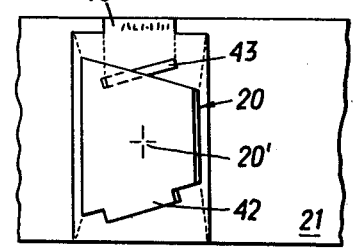

A construction unit A (FIG. 1) has an adjustment plate 10 consisting of glass or the like against which an original 11 readable with the naked eye, for example a book, hereinafter called a "macro-original", can be pressed from below, which original, for example, may have a format up to a maximum of 366 mm × 210 mm, that is, for instance, also including DIN A4 and DIN A5. In order also to be able to use open books as originals, the holder or mount for the original 11 is composed of a middle plate 12 and two laterally adjoining parts 13, 13', which are adjustable together in the vertical direction by actuating a mechanism 13", so that the macro-original 11 can be pressed against the adjustment plate 10 from below.

On the housing of the unit A there are moreover provided facilities 14 for incident-light illumination of the original 11, for example a flash device, and, in the upper part, a deflecting mirror 15. If the adjustment plate 10 is to be used not only for photographing originals in accordance with the largest reproducible book format (210 × 366 mm), but also for photographing originals in computer format of 279.6 × 355.6 mm, it has a size of, for example, 280 × 366 mm for also covering the computer format and is moreover mounted slidably in its plane in a guide. Because of this slidability, the sidewall parts of the housing are designed to be movable. For reproduction of originals in computer format, a lens with a smaller focal length is employed (or a suitably adjusted variable lens), in order to obtain an area-filling reproduction of the same format, preferably format DIN A5 (105 × 210 mm).

A unit B is applied against the unit A in light-tight contact therewith at its upper part and projecting laterally and contains a variable lens 17 with a horizontal optical axis (or, instead of this, at least an interchangeable fixed focal-length lens in mounts provided therefor) and a deflecting mirror 18 which produces a deflection of the ray path in a horizontal plane.

A unit C has in its basic equipment a deflecting mirror 20 which deflects the bundle of rays coming from the mirror 18 downwardly in a vertical direction, where it falls onto a photosensitive medium, for example photographic paper 21 with, for instance, a width of 21 cm, which can be withdrawn from a cassette (not shown), a supply roll 23 or a pre-cut paper supply. The lens 17 is so focused that it produces the image of the original on the strip of photographic paper 21 over an area of about 12 × 19 cm on a paper format of 14.8 cm × 21 cm (DIN A5), at which reduction the text is still readable with the naked eye. The exposed photographic paper is delivered to an immediately adjoining developing and fixing assembly (not shown) and can be removed therefrom, for example it can be torn or cut off.

The photosensitive medium is fed transversely of the longer dimension of the reproduction format, so that room is left at the margin of the short side of the format for the additional reproduction of identifying marks or features. This kind of feed also permits the parallel feed of a second photographic medium in strip form which can be used for identifying microfiches in jackets. Moreover, it provides favourable conditions for a possible change-over to reproductions of twice the area (DIN A4), which is then fed in the direction of the longer dimension, and, is the case of developing and fixing arrangements for photographic media of double the area, the feed of which takes place in the direction of the longer dimension of their format, for the purpose of changing over the feed in accordance with the halved format (for example, of DIN A4 across by DIN A5 vertically).

With such an arrangement, the photographic medium in strip form can also if necessary be finished simultaneously in the attached developing and fixing arrangement.

According to another constructional form of the unit C, instead of the mirror 20 deflecting the bundle of rays downwardly it can deflect it onto an image plane (cassette) (not shown) disposed above it. This is advantageous when a developing and fixing assembly having large dimensions is to be employed (for example, xerography on ordinary paper), so that the assembly does not have room on the underside, or when a build-up of heat is to be avoided when developing is carried out by means of heat.

The group of units A+B+C constitutes a reproduction apparatus by means of which originals of different macroformats (for example, folio, A4, A5 formats) can be reproduced on a uniform paper format (for example, DIN A5) by suitable choice of the imaging ratio by means of the variable lens 17 (or of fixed focal-length) lenses of like path length.

Another unit E (see also FIG. 3) can be attached to the unit C in light-proof contact therewith, this unit E having in its lower part an at least partially transparent plate 24 on which micro-originals, which may be both rolled and flat, can be mounted in the range of an illumination device 26 for transmitted light (or an illuminated device for incident light, not shown) by means of a suitable holding device 25 (only indicated). When the plate 24 is located, together with the holder, in the front position shown in solid lines, the ray path extends from below to a lens 28 for the purpose of re-enlarging the micro-original and to an inclined deflecting mirror 29 variable in position, for example swingable about a vertical axis 29', by which it is diverted in the horizontal direction.

The transparent plate 24 with the holding device 25 for the microfilm can be shifted along two guide rails 27, which are fixedly mounted on the housing of the unit E, into a second position situated further to the rear (shown in chain-dotted lines) for a purpose explained hereinafter, to which end the guide rails 27 are extended accordingly to the rear.

Another unit F which can be attached to the unit E opposite the unit C has an inclined mirror 30 and a reading plate 31 shown parallel to the table or desk top and which can preferably be positioned obliquely at least with the unit E about an axis 32 disposed transversely of the viewing direction. The reading plate of the unit F is located a little higher than the transparent plate 24 in the unit E.

If the mirror 29 is swung through 90° about a perpendicular (vertical) axis, opaque micro-originals can also be projected onto a perpendicular (vertical) plate or a wall of the room and be made readable in this way, it being possible for the unit F to be dispensed with.

In the second rear position of the plate 24, an illumination device 36 is located below the microfilm original and above it there is another lens 34, the optical axis 34' of which leads to a deflecting mirror 35 and a camera housing for a cassette H for miniature film. The parts 34, 35 and 36 form together a unit G of the construction set which, together with the associated camera housing and film cassette H, renders possible the reproduction of micro-originals of different formats in uniform miniature format on 16 mm film.

By swinging the two mirrors 20 and 29 about their vertical axes 20' and 29', respectively, into a position in which the reflecting surfaces face one another, the micro-original re-enlarged by the lens 28 can be directed on to the band of photographic paper 21 and in this way be reproduced so that it is readable with the naked eye.

Micro-originals of different formats mounted in the holder 25 can therefore, for example, be read on the plate 31 and a paper copy thereof readable with the naked eye can then be produced in the unit C or the micro-original can be shifted out of the unit E into unit G and be reproduced in uniform miniature format on miniature film in the unit H.

The arrangement, however, may also be such that the parts 26 and 28 can be swung out and at the same time the parts 34, 35 and 36 can be swung together with the unit H into the position in which they are above the holder 25 for the micro-original (not shown).

The unit H (miniature camera housing and cassette) may also be mounted on the top of the unit A together with a unit J, which contains a lens 37, as shown in chain-dotted lines in FIG. 2, the mirror 15 being so swung about the axis 15' at the same time that it is outside the ray path in the unit A and the ray path is directed from the macro-original via the lens 37 into the miniature film cassette of the unit H, whereby the macro-original can be reproduced therein in miniature format.

Moreover, there may be provided in the unit E (see FIG. 1), in addition to the micro-original holder 25, which serves for the larger microformats, another holder 63 for smaller microformats (preferably with a diagonal of 21.4 mm to 10.7 mm and less), in addition to the illumination device 26 another illumination device 64 and, in addition to the lens 28 another lens 65, which parts serve for photographing and re-enlarging smaller microformats. These components 63, 64 65 are mounted to be movable transversely in the housing of the unit E together with the components 25, 26 and 28, so that, as required, either the components 25, 26, 28 or the components 63, 64, 65 can be adjusted on the axis 29' and the ray path can be directed to the mirror 29 and from there either to the reading plate 31 or on to the photographic paper 21. Instead of a transverse movement, an exchange of position by swinging about a vertical axis may also be provided (not shown).

The unit G is also equipped with an additional illumination device 66 and a lens 67, these parts being movable transversely or swingable together with the parts 36 and 34, so that the smaller microformats shifted to the rear with the glass plate 24 can be reproduced by means of the lens 67 on miniature film (camera housing+cassette H). For this purpose, micro-originals of the following formats can be considered.

Micro-originals with a diagonal of 21.4 mm (Pocket Instamatic film), by way of formats with a diagonal of 17.78 mm (16 mm microfilm), unperforated, down to formats with a diagonal of 10.7 mm (COM format), so that micro-originals of the most frequent miniature systems can be covered and reproduced on a uniform image carrier. Exact reproduction of flat originals bearing texts by means of a variable lens is possible up to limit values of the imaging scale, which are as 2:1, so that the above-listed formats can be covered in an image field with the standard diameter of 18.0 mm. However, the reproduction of all originals is effected optionally on perforated or unperforated 16 mm microfilm fed by ulling, which is then suitable for further use in equipment systems for perforated and unperforated 16 mm microfilm. A simple and more suitable method of simultaneously putting identifying data on to the margin of a reproduction in macroformat which has been produced from a macro-orignal consists in that the adjustment plate 10 of the unit A (FIGS. 1 and 4) is at least 34 mm longer than the largest intended macro-original (folio format with a length of 33 cm) at its narrow side not visible in FIG. 1. Since the macro-originals are reproduced on the photographic paper 21 in the unit C on a uniform scale (for example 1:1.76), the identifying data to be reproduced can be placed below the marginal portion 40 (FIG. 4) of the adjustment plate 10, whereby they then also appear at the margin of the copy of the macro-original.

In order, however, not to restrict this simple method of reproducing the identifying data on the reproduction obtained solely to originals in macroformat, but also to make this possible on macroreproductions of microfilms, the arrangement which can be seen in FIGS. 5 to 8 has been produced.

To this end, the mirror 20 rotatable in the unit C through 180° about a vertical axis 20' has on one lateral edge a projecting portion 42 (FIGS. 6 and 8) located in its plane and which, like the mirror 20, has a reflecting coating on its surface facing the image plane 21. On its other lateral edge, the mirror 20 also has an applied strip-shaped mirror 43 which, however, is fixed to the mirror 20 only at its centre and is turned through 90° with respect to the place of the mirror 20 and likewise has a reflecting coating on its surface facing the image plane 21.

Consequently, if the ray path comes from the left (from the macro-original) (FIG. 5), the "identifying data" arranged below the strip 40 of the adjustment plate 10 and to be reproduced are imaged at the margin 45 (FIG. 6) of the photographic paper. If, however, the ray path comes from the right (from the micro-original) (FIG. 7) and the mirror has been turned through 180° about the axis 20', not only is the re-enlarged micro-original reproduced, but the "identifying data" adjusted below the marginal strip 40 of the adjustment plate 10 are also reproduced by the strip mirror 43 in the zone 46 (FIG. 8) next to the edge of the re-enlarged micro-original.

Figure 9:
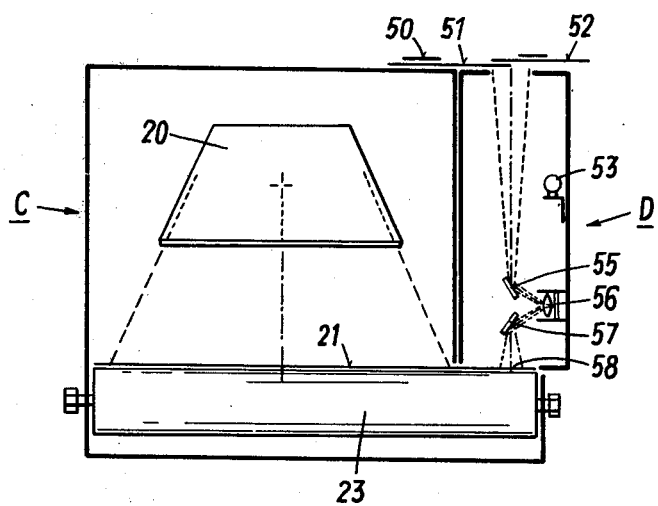
FIG. 9 is a side view of the units C and D in FIG. 1 from the right.

According to another construction, the rectangular mirror 20 is swingable about a horizontal axis and of such a width that it supplies the identifying data arranged at the edge of the macro-original (below the adjustment plate 10) to the photographic paper 21, so that they are reproduced at the margin thereof. This form of the mirror 20 needs a smaller amount of room than a mirror swingable about a vertical axis, which is important with originals in computer format, but permits only macro-originals to be reproduced simultaneously with these identifying data so that they can be read with the naked eye. Another possibility of reproducing groups of lines from pages of text or identifying data by means of the pieces of apparatus comprised in the construction set can be seen in FIGS. 1 and 9.

To the unit C there is added a unit D having at its top a holder and guide 50 for inserting and shifting at least one sheet, preferably two separate sheets 51 and 52 which bear the identifying data of the macro- or micro-originals to be reproduced in defined recording panels or areas and, during the reproduction of various pages, for example from one and the same book, are shifted with respect to one another by the width of a line. An incident-light device 53 (FIG. 9) throws light on to the identifying data borne by the two sheets 51, 52 and to be reproduced. The reproduction thereof is effected in known manner via a deflecting mirror 55, a lens 56, in which there is a second deflecting mirror, and a third deflecting mirror 57 on the marginal strip 58 of the photographic paper 21, which also receives the image of the macro- or micro-originals concerned in macroformat.

The mirror arrangement of the units E and F according to FIG. 1 is suitable only for reading on a plate or for reproducing microtexts on transparent material, because two mirrors are situated in the ray paths from the holder 25 for the micro-original to the reading plate 31 and to the reproduction plane 21, so that if a micro-original on non-transparent (opaque) material, for example paper, is mounted in the holder 25, a mirror-inverted image appears on the reading plate. The same applies to the reproduction of re-enlarged micro-originals in the image plane 21.

Figure 10:
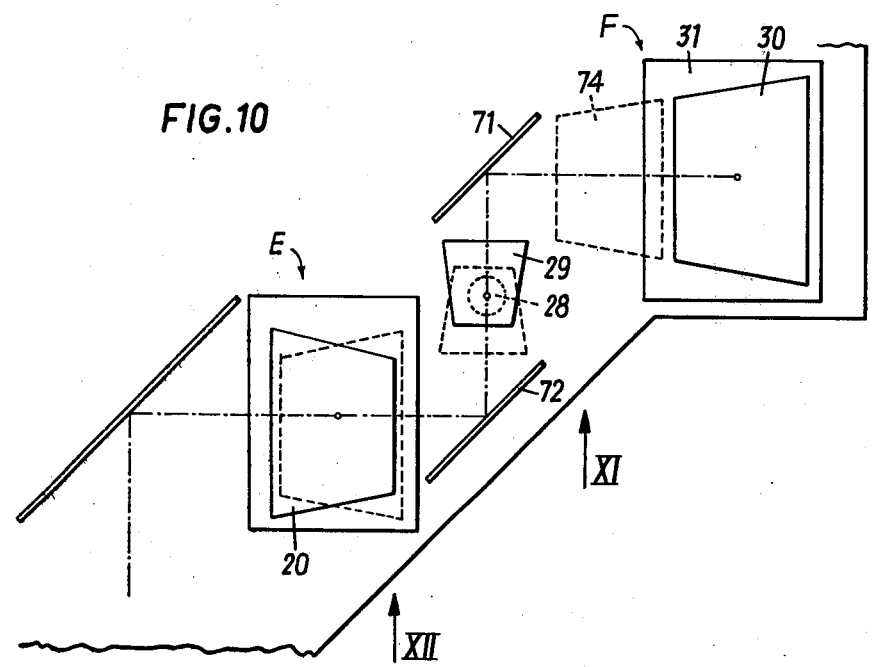
FIG. 10 is a view of a modified arrangement of the mirrors of the units E and F in plan.
Figure 11:
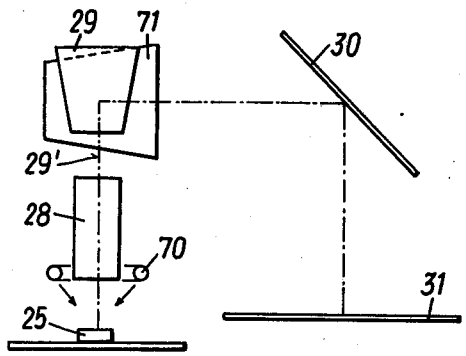
FIGS. 11 and 12 are views in the direction of the arrows XI and XII, respectively, in FIG. 10.
Figure 12:
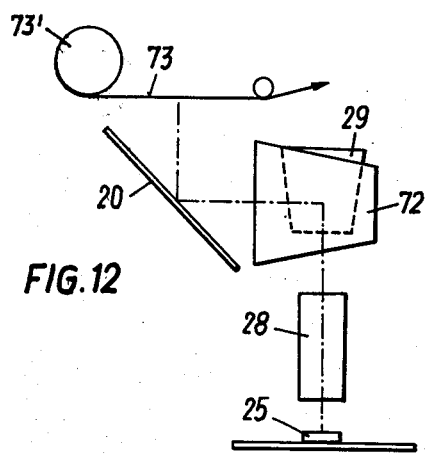

In order also to be able to read such opaque micro-originals and reproduce them in macroformat, the units E and F can be designed as shown in FIGS. 10, 11 and 12.

The vertical ray path passes from the micro-original holder 25, with which an incident-light illumination device 70, for example in annular form, is associated, through the lens 28 to the mirror 28 inclined at an angle of 45°, which, in the position shown in solid lines, deflects the ray path horizontally at an angle of 90°, the ray path falling on a mirror 71 which directs the ray path on to the mirror 30, from where it reaches the reading plate 31. Due to the triple change of reflection, the image appears in readable form. With a ring diameter of sufficient size, the annular light source makes possible a light yield which is glare-free for observation and reproduction in re-enlarged form of the most diverse microformats and stationary mounting of the light source which is good for all the formats.

For reproduction of a micro-original in macroformat, the mirror 29 is turned through 180° about the vertical axis 29' (to which the optical axis of the lens 28 corresponds) in the other direction and the ray path then reaches an obliquely arranged mirror 72 by which it is deflected in the horizontal direction on to the mirror 20, which directs the ray path upwardly in the manner shown in FIG. 12 on to a photosensitive medium 73 which is drawn from a supply roll 73' or a pre-cut pack of paper and, after exposure, is preferably delivered immediately to a developing and fixing arrangement.

The equipment (unit G) described for the reproduction of originals of different formats in uniform microformat, which can be used after shifting of the holder 25 or after swinging of the lens 34 on to the axis 29', does not require any deflecting mirror for reproducing opaque or transparent originals on miniature film. A miniature camera housing with a cassette can be mounted directly on the lens 34. The same applies to the reproduction of macro-originals on miniature film (units J and H).

Another optionally insertable mirror 74 may be provided in the ray flux extending from the micro-original to the reading plate 31 between the mirrors 71 and 30, the mirror 74 deflecting the ray flux through 90°, for example upwardly, and leading it to a reproduction plane. A very compact reading and reproduction apparatus (reader-printer) is therefore obtained. A developing and flying arrangement may adjoin this reproduction plane.

If the ray flux in an apparatus combined from two pieces of apparatus is directed in one of these from a macro-original 11 and in the second from a micro-original mounted in the holder 25, in each case via three deflecting mirrors, to a common reproduction plane (photographic paper 21) for freely readable image reproduction, this permits an arrangement of the construction units of the combined apparatus in L formation, which is particularly advantageous for the posture of the user and in which the user's seat and the table edges of the L formation are at a distance from one another which is right for the body and even macro-originals can be adjusted without hindrance at the side by the unit E.

According to a further development, the unit H, that is the arrangement for reproducing originals in microformat, has a device for film feed by pull and preferably in selectable, adjustable feed steps, or various interchangeable miniature cassettes and interchangeable housing parts with a feed mechanism for different feed steps, in particular 25.4 mm, 12.7 mm, 11.75 mm and 10.0 mm. With such an interchangeability or adjustability of the feed mechanism and of the feed steps which can be carried out therewith, miniature exposures can be made on 16 mm film from macro-originals in computer format (355.6 mm×279.4 mm) and less or in formats with a diameter of 58.8 mm and less, these exposures meeting the microfiche standards for 60 and 98 and the jacket standard for 60 images in DIN A6 format, complying with the Pocket Instamatic System and also meeting the standard for unperforated microfilm. Selectable feed steps of 25.4 or 12.7 mm are provided for the Pocket Instamatic System. An arrangement meeting the standard for the unperforated microfilm system requires feed steps of 11.75 mm and the internationally preferred microfiche standard with 98 miniature images with greater reduction requires feed steps of 10 mm. Thus, the miniature images obtained by means of the pieces of apparatus comprised in the construction set can be handled further both manually and mechanically in equipment of each of the said systems.

For microfilming of originals, the arrangement must be such that the longer side of the miniature image format is disposed transversely of the direction of the film feed and, with perforated 16 mm film, the miniature images are located in the portions of film between those boundaries of the film perforations which are closest to one another and, in the case of microfilmed computer format, are at a sufficient distance from the perforated film margin.

Among many kinds of common micro-image versions, the four mentioned are the most obvious in the case of 16 mm film from construction set apparatus. It is a condition that all originals are photographed in an image-field diameter of 18.0 mm at the most and with the use of one of the mentioned feed steps. Advantageously, the camera concerned is a miniature camera with interchangeable optical systems and with a feed mechanism suitable both for unperforated and for perforated 16 mm film and arranged for selectable feed steps.

It is advantageous to provide a feed mechanism which acts on the film by pulling. In this way, there is the possibility of employing perforated and unperforated films as photographic material precisely as appears expedient for handling the exposures in other apparatus.

Figure 13:
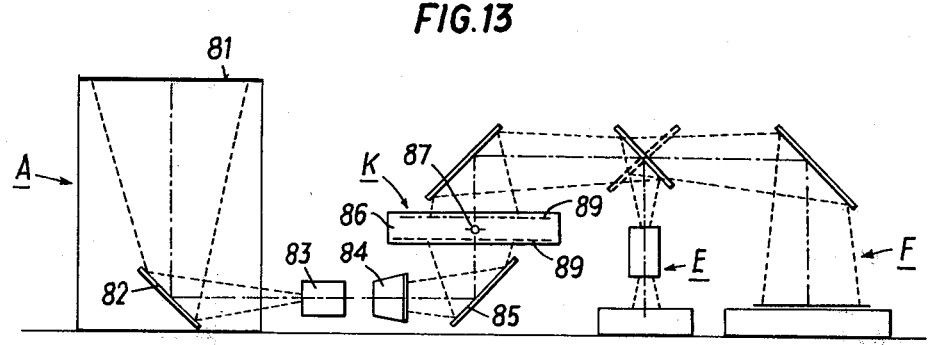
FIG. 13 is a diagram of a complete modified arrangement.

A favourable modification of the complete arrangement of the units A to E of the construction set is shown in FIG. 13. In this case, the ray flux extends from a transparent adjustment plate 81 located at the top, on which the macro-original is placed facing downwards, to a deflecting mirror 82 and to a lens 83 and from the latter, via a mirror 84 which deflects the ray flux in a horizontal plane, to a mirror 85, which re-directs the bundle of rays upwardly to a cassette 86 containing the photosensitive copying medium. The arrangement of the units E and F for macroreproduction and the reading of micro-originals is carried out as described with reference to FIG. 1.

The cassette 86 for the photosensitive medium is common to both ray paths and at such a distance from the table or desk top that it can be swung about a horizontal axis 87, so that the image plane for the reproduction of macro-originals can be adjusted directed downwardly and, for the reproduction of micro-originals, can be adjusted directly upwardly.

In such an arrangement, the costly adjustable book lifting table can be saved. Advantageously, there is also combined with the cassette 86 a developing and fixing assembly which can be swung together with the cassette and forms another unit K. In FIG. 13, the position of the image plane 89 for the reproduction of macro-originals is shown by a dash line and the position of the image plane for the reproduction of micro-originals is shown by a chain-dotted line.

Figure 14:
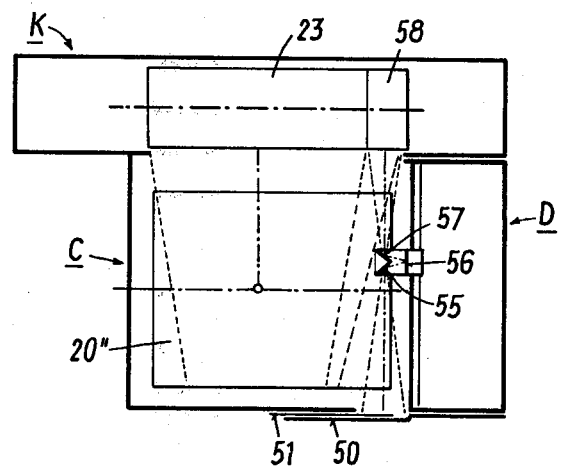
FIG. 14 is a vertical sectional view of a modified design of the units C and D.

As already mentioned hereinbefore and shown in FIG. 14, with an arrangement which is otherwise the same as regards the units A, B, E and F, the unit C may contain a rectangular deflecting mirror 20″ swingable through 90° about a horizontal axis and which deflects the ray path from the original text to a cassette disposed thereabove and having a developing and fixing arrangement which forms another unit K of the construction set. This unit K contains a supply of photographic paper in the form of a roll 23 which is wider than the bundle of rays coming from the original text, so that a marginal strip 58 is left free for applying identifying data. The photographic paper is drawn step by step from the roll 23, exposed from below and delivered to the attached developing and fixing arrangement, which is merely indicated.

In the unit D, in which the plane of the original is at the bottom in this case, the lens 56 and the deflecting mirrors 55 and 57 are so mounted at the side for applying the identifying data at the margin of the reproduction that, when the unit D is pushed into the housing of the unit C from the side, the ray path from the original, for example a card-index card 51 which can be introduced into a guide 50 mounted at the bottom, is projected and reproduced, via the mirror 55, the lens 56 combined with a mirror and the mirror 57, on the marginal strip 58 thereabove of the photographic paper 23. The mirror 20″ is so wide that even identifying data arranged below the margin of the adjustment plate 10 in the unit A can be projected on to the marginal strip 58 without using the unit D. The lens 56 is disposed outside the 90° swing of the mirror 20″ and outside the divergent ray path extending from the marginal portion of the adjustment plate 10 to the marginal portion 58. Of course, only one of the two kinds of projection of identifying data can be employed at any given time.

Figure 15:
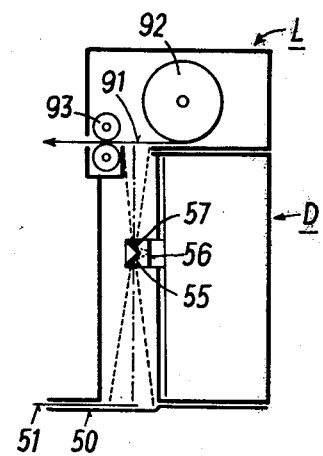
FIG. 15 is a vertical sectional view of a combination of the unit D with another unit L.

The same unit D may also be combined in accordance with FIG. 15 with another unit L which functions as an automatically operating feed-step camera and into which the unit D is pushed from the side. The unit L contains a band of photographic paper 91 which runs from a supply roll 92 to a developing and fixing arrangement 93. An original text introduced at the bottom into the guide 50 and the lines of which extend in this case transversely of the longitudinal direction of the band of photographic paper 91 is reproduced by means of the projection system 55 to 57 of the unit D. This unit L can be used for the separate reproduction of any groups of lines from pages of text, the individual lines being disposed transversely of the band of photographic paper 91. Weakening lines, for example perforations, in the photographic paper can facilitate the tearing off of the separate groups of lines.

Figure 16:
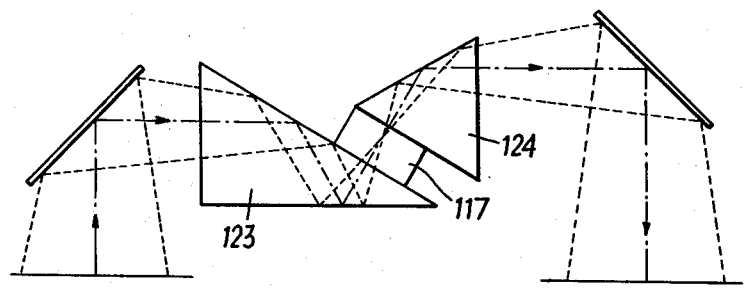
FIG. 16 is a view of a modified arrangement of reflecting surfaces.

In some cases, instead of the deflecting mirrors 15 and 18 which produce a deflection of the optical axis extending from the plane of the macro-original via the lens 17 to the deflecting mirror 20 in two vertical planes perpendicular to one another, an arrangement is to be preferred in which the optical axis extends in only one vertical plane. A path of this kind is shown in FIG. 16 and comprises a prism arrangement according to Abbe or Konig. In this case, the optical axis, coming from the macro-original, enters the prism 123, which has a longitudinal section in the form of a right-angled triangle, through the shorter cathetus, is deflected at the hypotenuse and the longer cathetus, then enters the lens 117 and is deflected a third time at a lateral face of a second prism 124, the optical axis of the emerging bundle of rays extending parallel, but shifted a little laterally, with respect to the optical axis of the entering bundle of rays. The reflecting surfaces of the prism may also be replaced by mirrors. An arrangement of this kind has the advantage of saving space for the same length of the optical axis, and also the advantage that an inclined position of the reading plate 31 which is right for the body is facilitated thereby, because owing to this path of the optical axis a projecting part of the base plate is dispensed with.

Arrangement of the lens 117 between the two prisms 123 and 124 permits the use of the smallest possible prisms and/or mirrors, which is favourable as regards cost and weight.

It is furthermore proposed that the possibility of choice between objectives or lenses with a fixed focal length and lenses which can be adapted to small path-length differences be provided for the construction set according to the invention. This allows the user of the apparatus, in the case of further extension or conversion of apparatus comprised in the construction set for obtaining a modified performance, to choose between cheaper lenses, with the acceptance of variations of format, and more costly lenses, without variations of format.

The necessary quality of the various mirrors of the construction set requires exceptional thicknesses of glass, which creates difficulties of weight and cost. In order to eliminate this drawback, it is provided that the surface reflecting coating be applied to finely polished plates of stable shape consisting of other construction materials, for example ceramic construction material, hard plastic or metal or that thinner glass plates with a reflecting coating be supported by such plates.

Items of optical apparatus which consist of units such as are formed by component parts of the above-described construction set are described in detail hereinafter.

Depending on the situation of the market, items of apparatus with different performances, which are assembled from the units of the construction set, can be marketed. It is immaterial in this connection whether the parts are easily undone or disengaged, for example are connected to one another by screws, magnets or resiliently engaging projections, push devices or the like, or cannot be undone or disengaged, for example are connected to one another by riveting, soldering, spot welding, cementing or the like.

Figure 17:
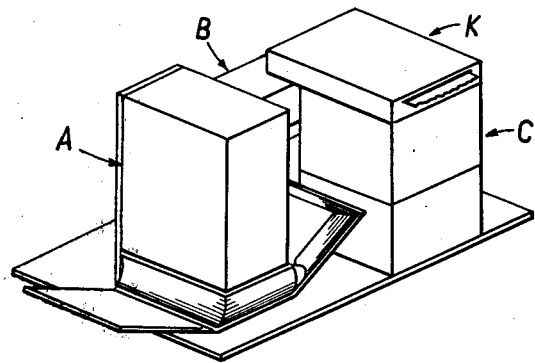
FIGS. 17 to 21 are diagrammatic perspective views of various types of optical apparatus produced from the construction set.

Such an optical apparatus of the simplest type is constructed, for example, in accordance with FIG. 17 and consists of the units A, B, C and K. It permits the reproduction of originals (macro-originals) of various formats readable with the naked eye, for example up to a size of 210×366 mm or 280×356 mm, in a uniform format readable with the naked eye, there being a fixed position relationship between the plane of the original and the image plane, and has a horizontally or approximately horizontally disposed original plane 10 (FIG. 1) with an illumination device 14 for the originals from which the ray path extends via at least one reflecting surface 15 to a variable lens or a lens of fixed focal length which can preferably be exchanged for lenses with different imaging scales and the optical axis of which is disposed substantially horizontally, form which lens the ray path extends via at least one reflecting surface 20 or 20″ to a substantially horizontal reproduction surface to which photosensitive material 21 can be fed from a supply 23 and can be delivered to a developing and fixing apparatus after exposure.

Other pieces of optical apparatus according to the invention are obtained by attaching further units of the described construction set or by employing them for construction in one of the described variants.

Figure 18:
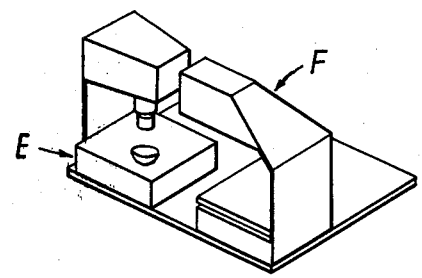

A start can also be made, however, from a microfilm reading apparatus according to FIG. 18 as a basic apparatus, this apparatus consisting of the units E and F and having an original plane with at least one holding device 25 (FIG. 1) for micro-originals, an illumination device 26 for transmitted light and/or incident light and, moreover, at least one re-enlarging lens from which the ray path extends via a movable mirror 29 to a reading plate 31.

Figure 19:
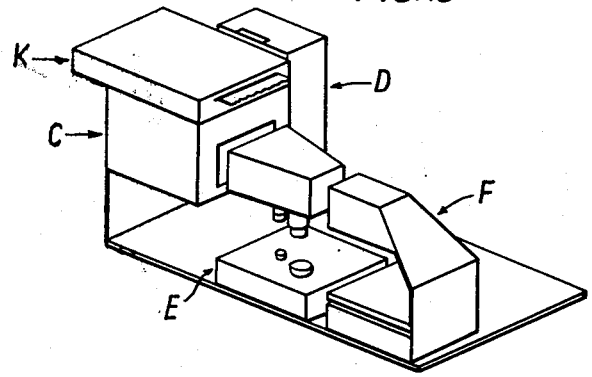

By adding the units C, D and K in accordance with FIG. 19, with a horizontal reproduction surface which is adjoined by a developing and fixing arrangement, an apparatus is obtained which allows micro-originals to be read on a reading plate and renders possible the making of reproductions thereof readable with the naked eye and which can be furnished with identifying data.

Figure 20:
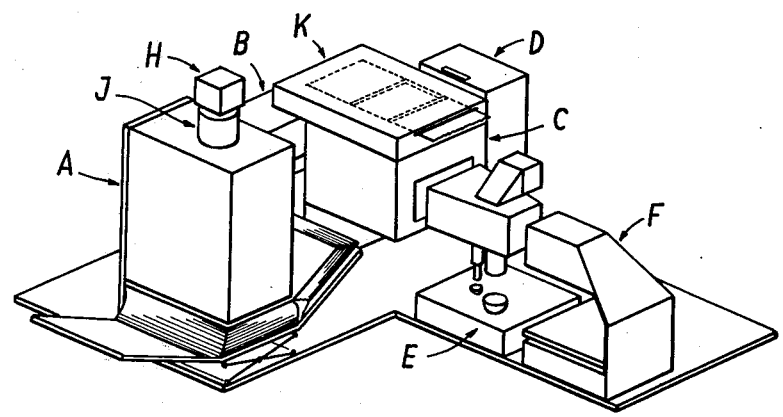
Figure 21:
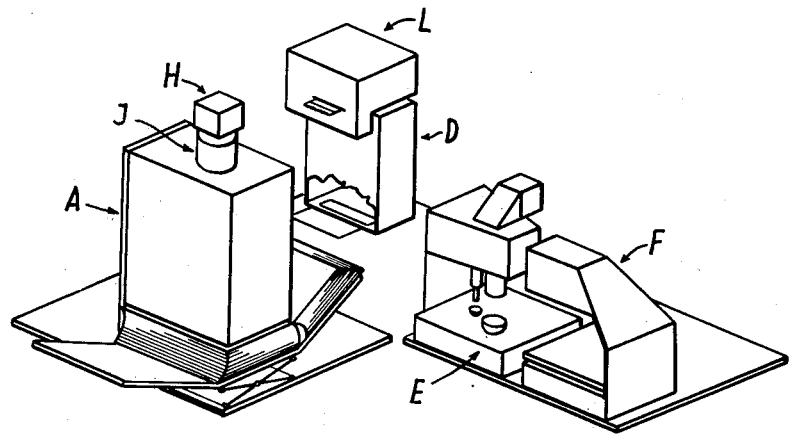

Other pieces of optical apparatus according to the invention are also obtained by combining further units of the construction set with one of these pieces of apparatus or by employing them for construction in one of the described variants. Combinations of this kind are shown in FIGS. 20 and 21.

Many more pieces of apparatus can be assembled with the above-described construction set, some important ones of which are mentioned in the following list, the units being given on the left and the possibilities of use on the right.

| Units | Possibility of use |
| --- | --- |
| A + B + C + D + K | Area-filling copying of macro-originals of different formats in uniform macroformat, together with application of identifying data |
| E + F + G + H | Reading of micro-originals on a reading plate or a screen and copying of micro-originals of different formats in uniform miniature format |
| (A + J + H) + (D + L) | Copying of macro-originals of different formats in uniform miniature format, copying of groups of lines, for example identifying data, on paper strip |
| A + B + C + D + E + F +K | Copying of macro-originals of different formats and of identifying data in uniform 1:1.76 reduction and reading and re-enlarged reproduction of microfilms, and also identification at the margin of the copies |
| (A + B + C + D + E + F + G + H + J + K) + (D + L) | Area-filling positive copying of macro-ioriginals of different formats in macroformat, reading and reproduction of re-enlarged micro-originals, application of identifying data at the margin of the macrocopies, reproduction of macro-originals and micro-originals of different formats in uniform miniature format and preparation of identifying data therefor on 16 mm paper strip for their identification in jackets |

These pieces of optical apparatus can naturally be provided with a housing adapted to their particular constructional form. However, they do not by any means have to be accommodated in a single housing or in interconnected housings, but may also form items of apparatus which are independent of one another, as is the case with the construction shown in FIG. 21.

| | |
| --- | --- |
| (A + J + H) + (E + F) + (D + L) (shown diagrammatically in FIG. 21) | Microfilming of macro-originals, preparation of identifying data to be added; reading of micro-originals on a screen or reading plate; copying of identifying data to be added or of groups of lines from texts; reading of micro-originals on a wall |

It is also advantageous to provide the lens or lenses incorporated in the apparatus with an adjusting device for keeping exact dimensions.

I claim:

1. Optical projection apparatus comprising: housing means; at least single-stage image-forming optical means mounted in said housing means for reducing projection of the image of originals of different formats readable with the naked eye and for re-enlarging projection of the image of micro-originals of different formats; image support means of uniform macroformat arranged to receive the projected images; said image-forming optical means establishing fixed path lengths for optical paths between respective planes of the original and the respective planes of projection, said planes of the original for macro-originals and micro-originals and said plane of projections being offset laterally with respect to one another; and mirror means including means adjustable for deflecting light beams incident thereon from the plane of the macro-original and from the plane of the micro-original alternatively onto the projection plane for macroreproduction, said mirror means providing at least two deflections between said optical means and said projection plane and directing said light parallel to the planes of the originals over at least part of said optical paths.

2. Apparatus as claimed in claim 1, wherein said planes of the original and of projection are parallel to one another, said mirror means including mirrors for deflecting said light beam projecting macro-originals in macroprojection once before said optical means and twice thereafter, and mirrors for deflecting said light beam for re-enlarging projection of micro-originals at least twice by mirrors only after said optical means.

3. Apparatus as claimed in claim 1 wherein the optical axis of the optical means for reproduction in macroformat extends parallel to the plane of the macro-original and the optical axis of the optical means for projection of micro-originals extends perpendicularly to the plane of the micro-original.

4. Apparatus as claimed in claim 1, wherein said adjustable means includes at least one deflecting mirror mounted to be variable in position in the path of the light from the planes for macro- and micro-originals to the plane for macroprojection.

5. Apparatus as claimed in claim 1, wherein said mirror means includes a last deflecting mirror in the light paths from the planes for macro-originals and micro-originals to the plane of reproduction in macroformat which is mounted to be variable in position and the two light paths have a common plane of reproduction.

6. Apparatus as claimed in claim 1, wherein said housing means comprises at least two component housings attached laterally to one another and each having at least one lateral opening for the passage of light.

7. Apparatus as claimed in claim 1, wherein said housing means comprises a housing part containing an adustment plate defining said plane for macro-originals and has mounted therein a mirror variable in position, said housing part having an opening for the passage of light for microfilming the macro-originals and a construction unit in the form of an insertable microfilm camera which covers said opening.

8. Apparatus as claimed in claim 7, including another construction unit with a microfilm camera adapted to be inserted above an adjustment plate at said micro-image plane in place of the adjacent portion of said optical means and having a deflecting mirror behind lens means.

9. Apparatus as claimed in claim 1, wherein said housing means comprises a holder for at least one original, and including an illumination device, a lens and at least one deflecting mirror for applying identifying data at the margin of said image support means.

10. Apparatus as claimed in claim 1, wherein for macro-reproduction exchangeable cassettes for photosensitive media are provided having a fixing and feed arrangement.

11. Apparatus as claimed in claim 1, in which said mirror means includes a movable mirror between said micro-original and projection planes and wherein there is provided a further projection plane for reading re-enlarged micro-originals on to which light can be directed by said movable mirror and which is adjustable in various positions by swinging about an axis extending transversely of the line of vision of the user.

12. Apparatus as claimed in claim 8, wherein there is provided an opaque plane of projection for reading re-enlarged micro-originals which is located higher than said adjustment plate disposed beside it in the plane of the micro-original.

13. Apparatus as claimed in claim 1, wherein for attachment to part of said housing which part defines the plane of projection for macroreproduction there is provided a construction unit having a holder for at least one original support containing identifying data, there being arranged an illumination device therefor and a lens rendered reflecting, and deflecting mirrors arranged respectively before and after the said lens, which mirrors direct the light with the identifying data coming from the original support on to the margin of the said image support and in this way form an image thereof thereon.

14. Apparatus as claimed in claim 13, wherein said deflecting mirrors before and after the reflecting lens are arranged to be rotated together with it through 180° about an optical axis striking the first deflecting mirror, and the reflecting lens and the deflecting mirror after the reflecting lens are located outside the axis of rotation in such manner that by rotation of the reflecting lens and the two deflecting mirror through 180° the identifying data can be imaged optionally at the margin of the image support.

15. Apparatus as claimed in claim 14, wherein at least part of said identifying data can be imaged on a narrow image support arranged parallel to the first-mentioned image support for reproduction readable with the naked eye.

16. Apparatus as claimed in claim 1, wherein the light from the plane for micro-originals is directable via the said optical means and via three mirrors arranged in series alternately on to a reading plate and a photosensitive medium, so that micro-originals consisting of opaque material can also be made readable on the reading plate and reproduced in readable form on photosensitive paper.

17. Apparatus as claimed in claim 1, including a transparent adjustment plate defining said macro-original plane, and wherein said housing means comprises a first group of construction units housing an arrangement allowing macro-originals to be pressed against said transparent adjustment plate from below and this arrangement can be shifted with respect to the associated said optical means.

18. Apparatus as claimed in claim 17, wherein said adjustment plate has a size suitable for use with originals in computer format (356 mm×280 mm) and is mounted in a guide to be slidable in its plane in the direction of its smaller dimension.

19. Apparatus as claimed in claim 18, wherein said housing means have movable side-wall parts above said adjustment plate.

20. Apparatus as claimed in claim 1, wherein said housing means includes a group of construction units arranged for at least two pairs of optionally usable lenses associated with the plane of the micro-original, one of which pairs is assigned to the larger micro-originals and the other to the smaller micro-originals, optional adjustment being obtainable by changing the position of the pair of lenses concerned, said optical means including said lenses.

21. Apparatus as claimed in claim 20, wherein the lens assigned to the smaller micro-originals and intended for imaging in microformat is an exchangeable lens of fixed focal length covering micro-originals with diagonals between 21.4 mm and 10.7 mm in area-filling manner and imaging them in miniature format with a diagonal of 18.0 mm±10%.

22. Apparatus as claimed in claim 1, wherein light can be directed from the plane for micro-originals via the associated lens and a deflecting mirror against a vertical surface, said optical means and mirror means respectively including said lens and mirror.

23. Apparatus as claimed in claim 1, wherein the optical path from the plane for macro-originals extends first downwardly, then horizontally and then upwardly to the reproduction plane, which is directed downwardly whereas the optical path from the plane for micro-originals extends first upwardly, then horizontally and finally downwardly to the reproduction plane, said image support means comprising a cassette for accommodating photosensitive medium swung optionally through 180° about a horizontal axis into the downwardly and upwardly directed positions alternately of the photosensitive medium.

24. Apparatus as claimed in claim 1, wherein means are provided for feeding photosensitive medium for freely readable reproductions transversely of the longer dimension of the image support format and room for the additional reproduction of groups of lines is provided at one of the small-side margins of the image format.

25. Apparatus as claimed in claim 1, wherein a group of mirrors in the form of an Abbe prism combination is interposed in the path from one of the original planes to the reproduction plane.

26. Apparatus as claimed in claim 25, wherein said optical means comprises a lens arranged between the second and third reflecting surfaces of the said combination.

27. Apparatus as claimed in claim 1 for reproduction of macro-originals of various formats up to a size of 366×280 mm, in a format readable with the naked eye, and having a fixed position relationship between the plane of the original and the image support means, wherein said plane for the macro-original is at least approximately horizontally disposed and including all illumination device for the original, from which the ray path extends via a reflecting surface to said optical means, which includes at least one lens and provision for selecting different imaging scales, from which lens the ray path extends horizontally, after another reflecting surface, to a third reflecting surface and, deflected by this, to a reproduction surface defining said image support means and supply means for feeding photosensitive material to said reproduction surface for exposure and thereafter to a developing and fixing arrangement.

28. Apparatus as claimed in claim 1, for projection and reproduction of micro-originals, comprising an adjustment plate defining said micro-original plane with at least one holding device for micro-originals and an illumination device, said optical means comprising at least one lens for re-enlargement, from which the ray path extends via a movable mirror selectively alternately to a reading plate and a reproduction surface parallel to the adjustment plate and the reading plate.

29. An optical projection apparatus comprising a housing, a first original plane for macro-originals, a second original plane for micro-originals, a first image forming optical system in a first ray path starting out from the macro-original plane, a second image-forming optical system in a second ray path starting out from the micro-original plane, at least one mirror in the first ray path and at least one other mirror in the second ray path, the two mirrors each diverting the associated ray paths approximately in a direction parallel to the associated original plane, the optical system in the first ray path producing an image of the macro-original not larger than the macro-original, the optical system in the second ray path producing an enlarged image of the micro-original in a size which can be read with the naked eye, a recording medium and a means interposed between said recording medium and said original planes and actuable for alternately steering the first and second ray paths onto said recording medium, and thus reproducing said not larger macro-original image or said enlarged micro-original image on the recording medium in a uniform format.

30. Projection apparatus according to claim 29, in which the means for the alternating steering of the two ray paths onto a common recording medium comprises a mirror which lies in the ray path and is adjustable in position.

31. Projection apparatus according to claim 29, in which the device for the alternating steering of the two ray paths onto a common recording medium is a reversible cassette.

32. Projection apparatus according to claim 29, in which a fixed length of ray path lies between the respective original plane and the recording medium, the image-forming optical system of at least one of the two ray paths being adjustable to various focal distances for the reproduction of originals of various sizes on the recording medium in uniform format.

33. Projection apparatus according to claim 29, in which said mirror in the second ray path can be changed in position, for steering the ray path selectively (1) against a wall which is perpendicular with respect to the micro-original plane, and (2) through at least one further mirror onto a reading plate.

34. Projection apparatus according to claim 29, in which the recording medium is oriented for transporting transversely to the longer dimension of a rectangular elongated projection field, and including a mask defining at one of the narrow side edges of the projection field a border field at the recording medium for the additional reproduction of identifying data.

35. Projection apparatus according to claim 29, including a third ray path extending from a third original plane through a further image-producing optical system and at least one surface mirror onto a defined edge field of the recording medium for reproducing identifying data on said edge field.

36. Projection apparatus according to claim 29, in which the recording medium is arranged in an exchangeable cassette for recording with media of different type.

37. Projection apparatus according to claim 29, including a micro-film camera mounted above one of said original planes for photographing an original thereon.

38. Projection apparatus according to claim 29, including a transparent adjusting plate having one surface which is one of said original planes, and a guideway in the plane of the adjusting plate in which the latter is movable.

39. Projection apparatus according to claim 29, in which the portion of the apparatus for the projection of micro-originals has a reading plate and at least said other mirror which lies in the associated flow of rays, at least one of said reading plate and other mirror being pivotal about a horizontal axis.

40. Projection apparatus according to claim 29, including a plurality of structural units; said original planes, optical systems, mirrors and recording medium being contained in ones of said structural units being variously assemblable together to form projection devices and reproduction devices, said units having respective housings connectible to one another, said connected housings having openings communicating with each other along ray paths for passage of light rays from one housing to the next through said openings.

41. Projection apparatus according to claim 29, in which said second optical system for the macro-reproduction of micro-originals can be adjusted to focal distances for the projection of original diameters ranging between 10.7 to 21.4 mm.

42. Projection apparatus according to claim 29, including a device for micro-filming of originals, said device being adjustable to variously large switching steps of its recording medium.

* * * * *

UNITED STATES PATENT OFFICE
CERTIFICATE OF CORRECTION

Patent No. 4 181 427          Dated January 1, 1980

Inventor(s) Johann Rotter

It is certified that error appears in the above-identified patent and that said Letters Patent are hereby corrected as shown below:

Col. 16, line 40; change "all" to ---an---.

Signed and Sealed this

Sixth Day of May 1980

[SEAL]

Attest:

SIDNEY A. DIAMOND

Attesting Officer          Commissioner of Patents and Trademarks